United States Patent
Lee et al.

(10) Patent No.: US 11,678,258 B2
(45) Date of Patent: Jun. 13, 2023

(54) METHOD AND DEVICE FOR RECEIVING SYSTEM INFORMATION ON BASIS OF BEAM INFORMATION

(71) Applicant: LG Electronics Inc., Seoul (KR)

(72) Inventors: Youngdae Lee, Seoul (KR); Hanbyul Seo, Seoul (KR); Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 252 days.

(21) Appl. No.: 16/065,026

(22) PCT Filed: Jul. 14, 2017

(86) PCT No.: PCT/KR2017/007540
§ 371 (c)(1),
(2) Date: Jun. 21, 2018

(87) PCT Pub. No.: WO2018/016799
PCT Pub. Date: Jan. 25, 2018

(65) Prior Publication Data
US 2020/0288451 A1   Sep. 10, 2020

Related U.S. Application Data

(60) Provisional application No. 62/364,823, filed on Jul. 20, 2016.

(51) Int. Cl.
*H04W 48/14* (2009.01)
*H04W 72/02* (2009.01)
(Continued)

(52) U.S. Cl.
CPC .......... *H04W 48/14* (2013.01); *H04B 7/0695* (2013.01); *H04W 48/08* (2013.01);
(Continued)

(58) Field of Classification Search
CPC .......... H04W 72/046; H04W 72/02; H04W 72/042; H04W 72/08; H04W 74/006;
(Continued)

(56) References Cited

U.S. PATENT DOCUMENTS

2011/0205952 A1* 8/2011 Gou ................. H04W 72/1278
370/312
2016/0099763 A1  4/2016 Chen
(Continued)

FOREIGN PATENT DOCUMENTS

| KR | 20140056561 A | 5/2014 |
| KR | 20140133481 A | 11/2014 |
| KR | 20160081810 A | 7/2016 |

OTHER PUBLICATIONS

"3rd Generation Partnership Project;Technical Specification Group Radio Access Network; Evolved Universal Terrestrial Radio Access (E-UTRA); Radio Resource Control (RRC); Protocol specification (Release 9)," 3GPP TS 36.331, V9.3.0, Jun. 2010, 250 pages.

*Primary Examiner* — Joshua Kading
(74) *Attorney, Agent, or Firm* — Fish & Richardson P.C.

(57) ABSTRACT

A method for a terminal to receive system information in a wireless communication system on the basis of beam information, and a device supporting the method are provided. The method may comprise: a step of selecting a beam; a step of transmitting, to a base station, a system information request including a random access channel (RACH) preamble corresponding to the selected beam; a step of receiving a response to the RACH preamble from the base station, wherein the response to the RACH preamble includes beam information indicating a specific beam; and a step of receiving system information requested by the system information request, via the specific beam indicated by the beam information.

10 Claims, 12 Drawing Sheets

(51) Int. Cl.
   *H04W 72/044*   (2023.01)
   *H04W 74/08*   (2009.01)
   *H04B 7/06*   (2006.01)
   *H04W 74/00*   (2009.01)
   *H04W 48/08*   (2009.01)
   *H04W 72/23*   (2023.01)
   *H04W 72/54*   (2023.01)

(52) U.S. Cl.
   CPC ......... *H04W 72/02* (2013.01); *H04W 72/046* (2013.01); *H04W 72/23* (2023.01); *H04W 72/54* (2023.01); *H04W 74/006* (2013.01); *H04W 74/0833* (2013.01)

(58) Field of Classification Search
   CPC ..... H04W 48/08; H04W 48/20; H04W 48/14; H04B 7/0695
   See application file for complete search history.

(56) References Cited

U.S. PATENT DOCUMENTS

| | | | |
|---|---|---|---|
| 2016/0128055 A1 | 5/2016 | Xiong | |
| 2016/0192401 A1* | 6/2016 | Park | H04W 72/046 370/329 |
| 2016/0234736 A1* | 8/2016 | Kubota | H04L 12/18 |
| 2017/0111886 A1* | 4/2017 | Kim | H04W 48/14 |
| 2017/0251500 A1* | 8/2017 | Agiwal | H04W 72/0413 |
| 2017/0311290 A1* | 10/2017 | Adjakple | H04W 76/18 |
| 2018/0049244 A1* | 2/2018 | Lee | H04W 76/27 |
| 2019/0053131 A1* | 2/2019 | Suzuki | H04W 48/10 |
| 2020/0296765 A1* | 9/2020 | Kim | H04W 74/0833 |

\* cited by examiner

METHOD AND DEVICE FOR RECEIVING SYSTEM INFORMATION ON BASIS OF BEAM INFORMATION

CROSS-REFERENCE TO RELATED APPLICATIONS

This application is a National Stage application under 35 U.S.C. § 371 of International Application No. PCT/KR2017/007540, filed on Jul. 14, 2017, which claims the benefit of U.S. Provisional Application No. 62/364,823, filed on Jul. 20, 2016. The disclosures of the prior applications are incorporated by reference in their entirety.

BACKGROUND OF THE INVENTION

Field of the Invention

The present invention relates to wireless communication and, more particularly, to a method for receiving, by a user equipment, system information based on beam information.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beamforming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

Meanwhile, the number of system information blocks is continuously increasing. The use of wireless resources is necessary for the broadcast of system information blocks, and thus as the number of system information blocks increases, the amount of radio resources required for broadcasting the system information block also increases. To solve this problem, on-demand system information (OSI) has been proposed. In the case of the on-demand system information, a user equipment (UE) can request system information from a cell, and the network receiving the request can transmit the requested system information to the UE. Furthermore, in order to achieve a high transmission data rate in a 5G communication system, a very high frequency band is considered, and a beamforming technology is discussed to mitigate the path loss of an electric wave in a very high frequency band and to increase a transmission distance of the electric wave. Therefore, a method for receiving on-demand system information through beamforming needs to be newly proposed.

In an aspect, a method for receiving, by a user equipment, system information based on beam information in a wireless communication system is provided. The method includes selecting a beam, transmitting a system information request including a random access channel (RACH) preamble corresponding to the selected beam to a base station, receiving a response to the RACH preamble from the base station, wherein the response to the RACH preamble includes the beam information indicating a specific beam, and receiving the system information requested by the system information request through the specific beam indicated by the beam information.

The system information request may be transmitted in a system information request period. The requested system information may be received in a system information reception period. The system information request period and the system information reception period may not be overlapped with each other.

The beam information may indicate that the system information request can be transmitted in the system information request period.

The beam information may indicate that the system information request cannot be transmitted in the system information reception period.

The beam information may indicate that the requested system information is to be transmitted in the system information reception period through the specific beam.

The beam information may be received through a master information block (MIB) or a system information block 1 (SIB1).

The method may further include retransmitting the system information request including the RACH preamble corresponding to the selected beam to the base station if the requested system information is not received. The method may further include re-receiving the system information requested by the system information request through the specific beam indicated by the beam information.

The method may further include transmitting a negative acknowledgment (NACK) to the base station if the requested system information is not received.

The method may further include measuring a quality of a plurality of beams transmitted by the base station. The selected beam may be a beam having a best measured quality among the plurality of beams transmitted by the base station. The selected beam may be a beam of which the measured quality is greater than or equal to a predefined threshold among the plurality of beams transmitted by the base station.

In another aspect, a user equipment for receiving system information based on beam information in a wireless communication system is provided. The user equipment includes: a memory; a transceiver; and a processor connecting the memory and the transceiver, in which the processor is configured to: select a beam; control the transceiver to transmit a system information request including a random access channel (RACH) preamble corresponding to the selected beam to a base station; control the transceiver to receive a response to the RACH preamble from the base station, in which the response to the RACH preamble includes the beam information indicating a specific beam; and control the transceiver to receive the system information requested by the system information request through the specific beam indicated by the beam information.

The requested system information can be efficiently received based on the beamforming.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
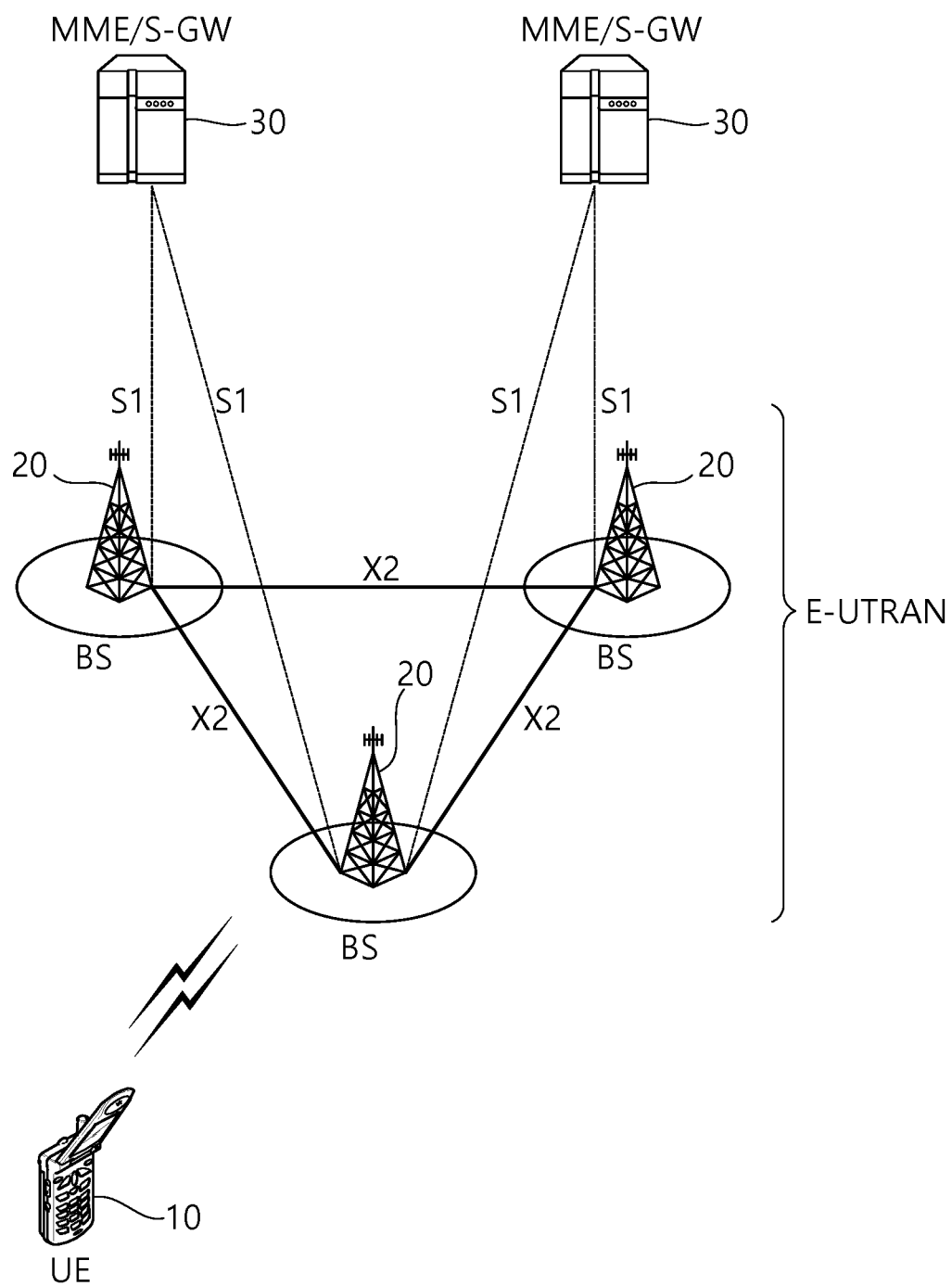
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
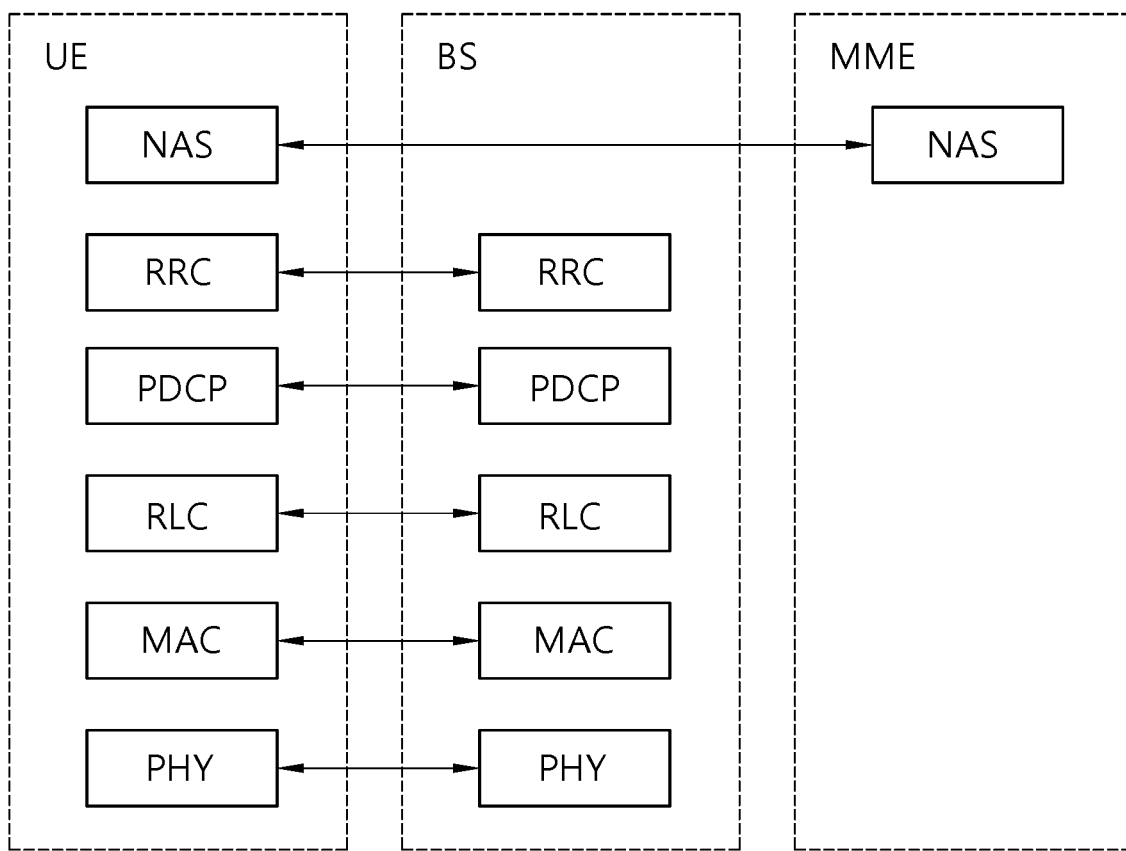
FIG. 2 shows a control plane of a radio interface protocol of an LTE system.
Figure 3:
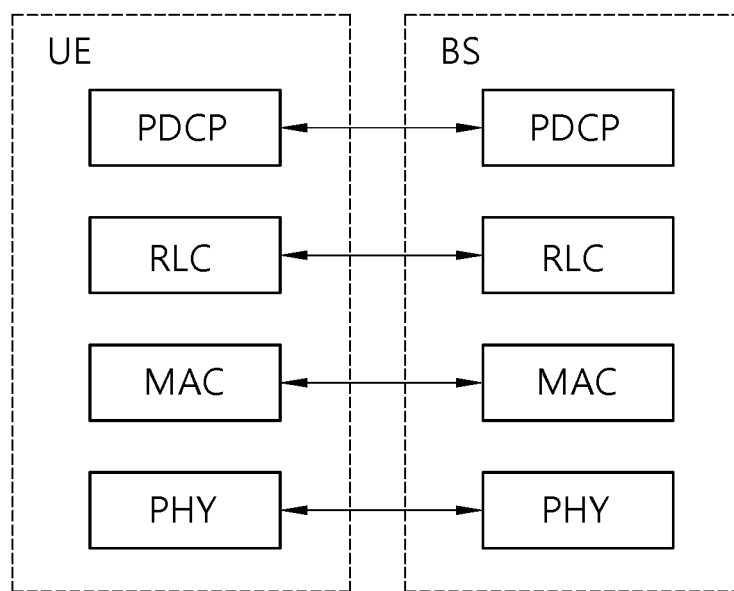
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
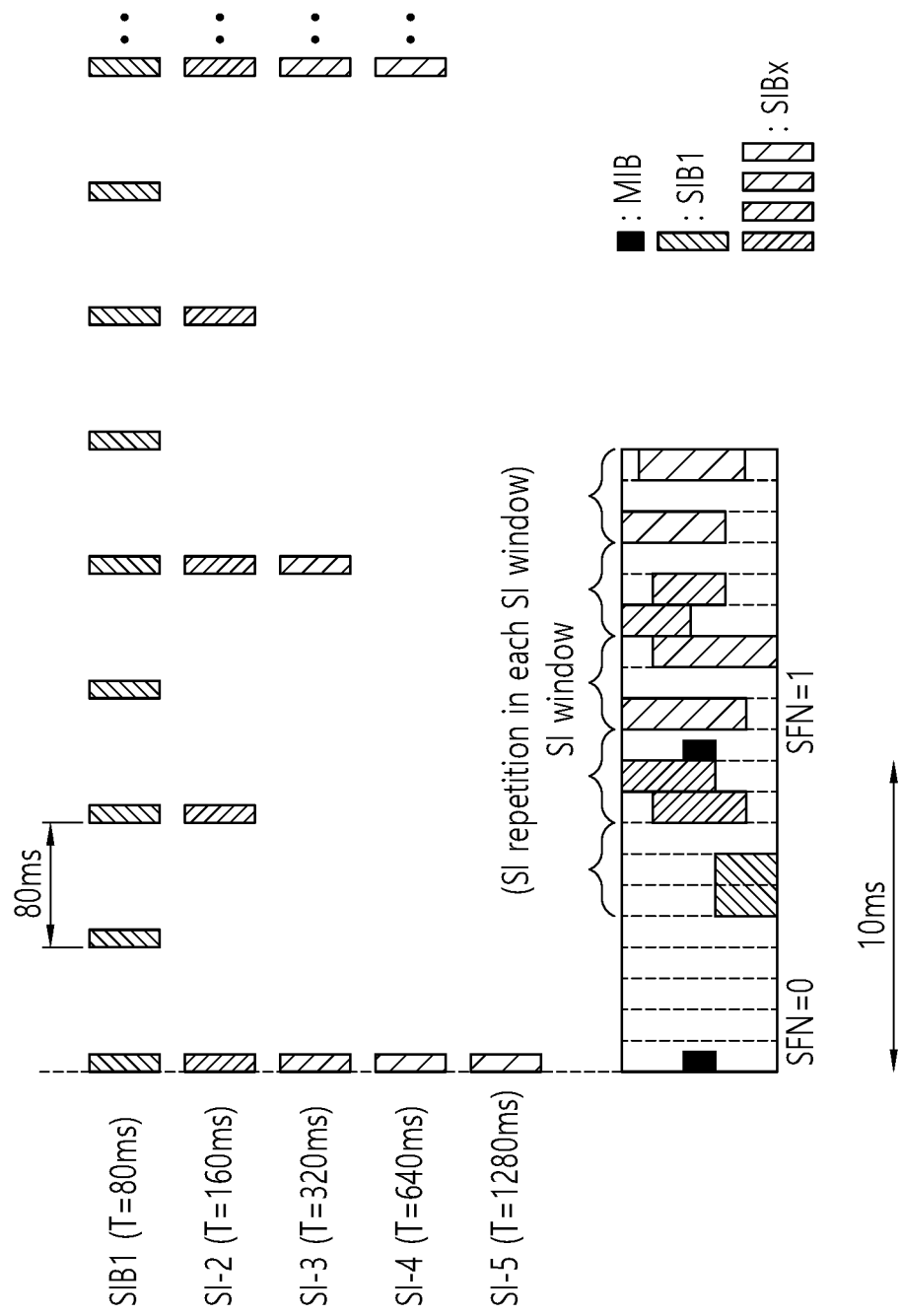
FIG. 4 shows an example of transmitting a master information block (MIB), system information block1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9.3.0," which is described in detail.

Figure 5:
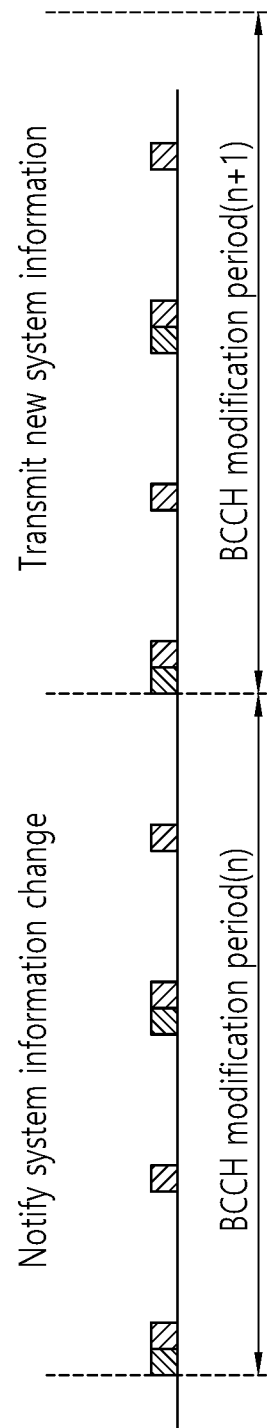
FIG. 5 shows an update of system information.

FIG. 5 shows an update of system information.

Referring to FIG. 5, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, beamforming will be described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 6:
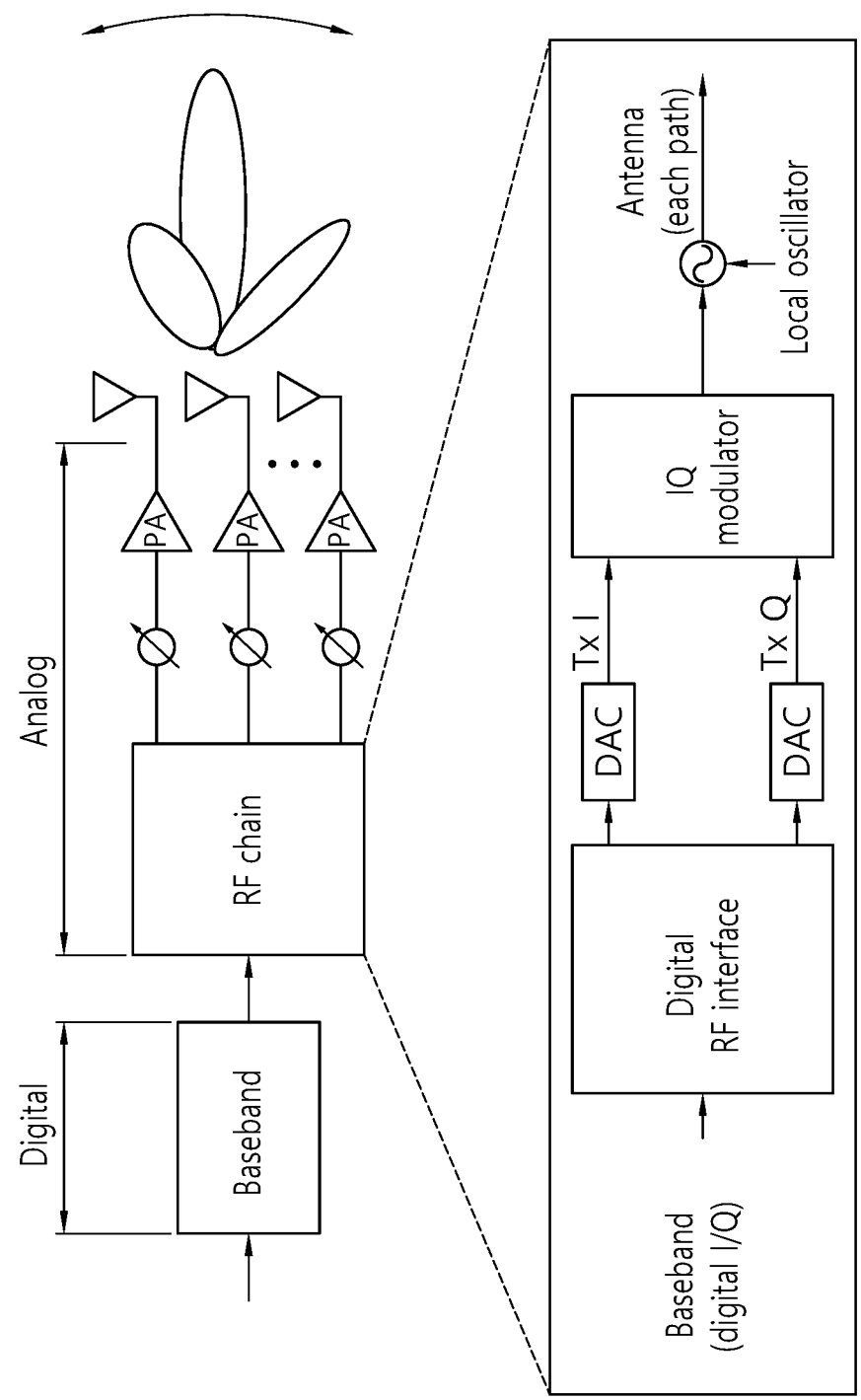
FIG. 6 shows an example of an analog beamforming.

FIG. 6 shows an example of an analog beamforming.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 7:
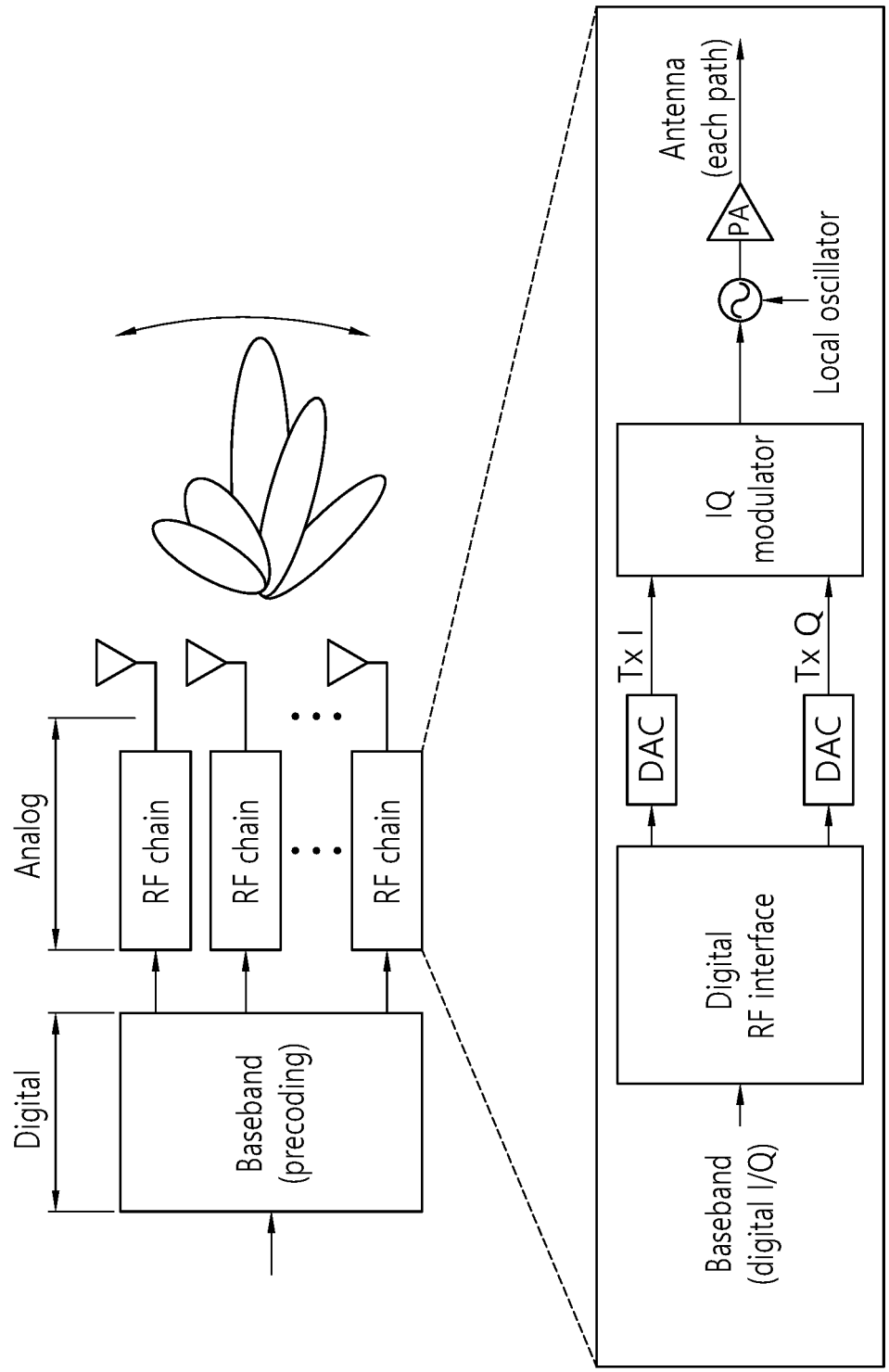
FIG. 7 shows an example of a digital beamforming.

FIG. 7 shows an example of a digital beamforming.

In digital beamforming, as opposed to analog beamforming, a beam is formed in the digital stage by a baseband process, in order to maximize diversity and multiplexing gain in an MIMO environment. Referring to FIG. 7, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 8:
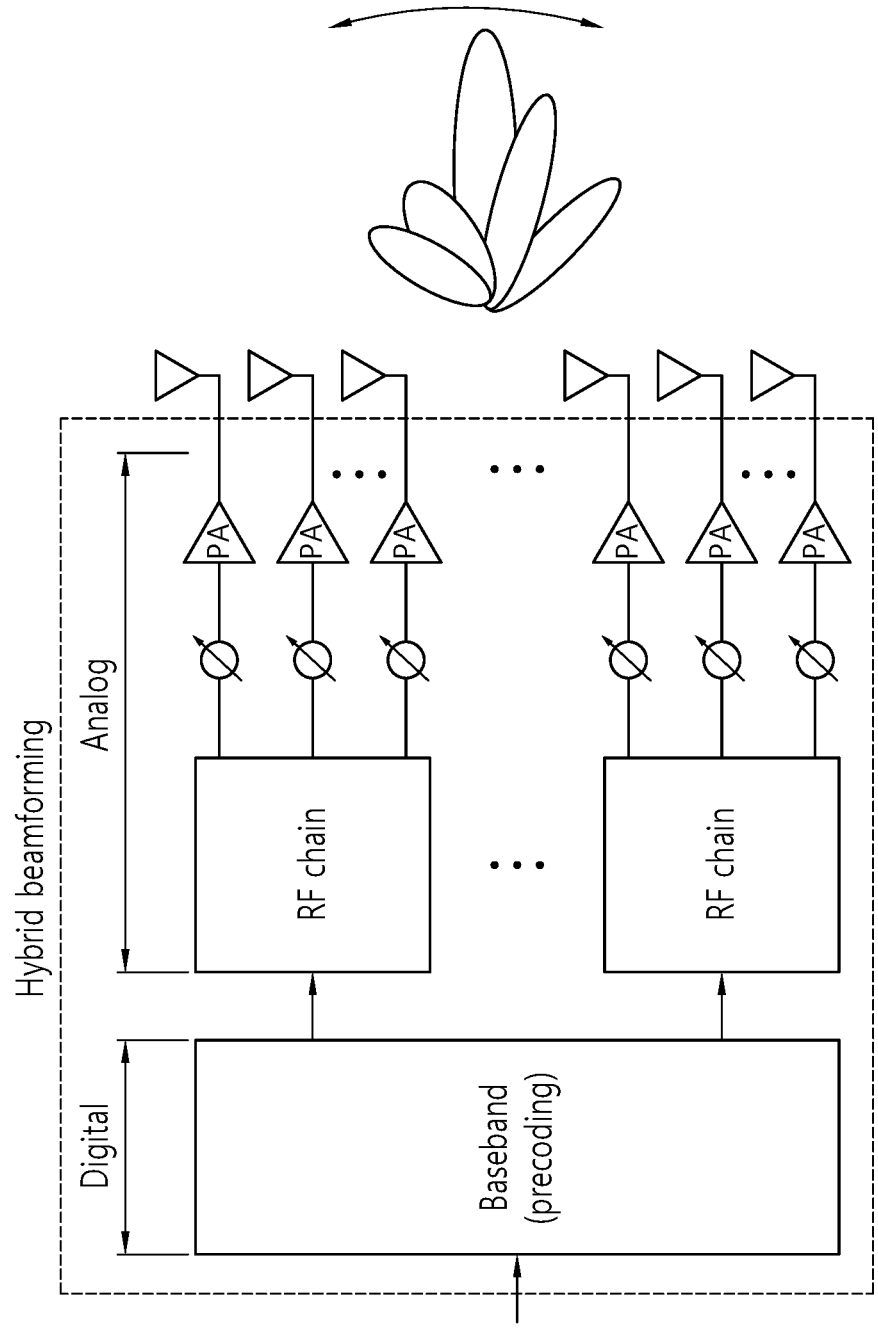
FIG. 8 shows an example of the hybrid beamforming.

FIG. 8 shows an example of the hybrid beamforming.

As described above, the hybrid beamforming is aimed at configuring a transmitting end capable of taking advantage of the advantages of analog beamforming and digital beamforming in a large MIMO environment. Referring to FIG. 8, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

On the other hand, the number of system information blocks is continuously increasing. The use of wireless resources is necessary for the broadcast of system information blocks, and thus as the number of system information blocks increases, the amount of radio resources required for broadcasting the system information block also increases. To solve this problem, a new type of system information has been proposed. The new type of system information is not always broadcast by the network, but can be transmitted from the network only when the UE requests system information. This type of system information can be referred to as on-demand system information (OSI) or minimum system information (MSI).

The UE can request the system information, and the network receiving the request can transmit the requested system information to the UE. In order for the UE to receive the OSI, a beamforming-based OSI delivery method needs to be newly proposed. Hereinafter, a method for receiving system information based on beam information and a device supporting the same will be described according to an embodiment of the present invention.

According to an embodiment of the present invention, the UE may be allowed to request an OSI in a cell during a particular system information period (SI period). For example, the specific system information period may be one of a BCCH modification period, a BCCH repetition period, or a system information request period (SI request period). After the network receives the request of the OSI from the UE, the network can transmit the requested OSI. The requested OSI may be transmitted in the corresponding SI period or the next SI period. For example, the corresponding SI period may be a system information reception period (SI reception period). For example, the next SI period may be a BCCH change period following the BCCH change period in which the OSI is requested, or a BCCH repeat interval following the BCCH repeat period in which the OSI is requested.

According to an embodiment of the present invention, when a UE requests system information, the UE may indicate a beam selected to receive the requested system information. The network may inform the UE what beam is to be used to periodically transmit the requested system information in the corresponding SI period or the next SI period. In addition, the network can inform the UE whether the UE can request the OSI within a specific SI period.

Figure 9A:
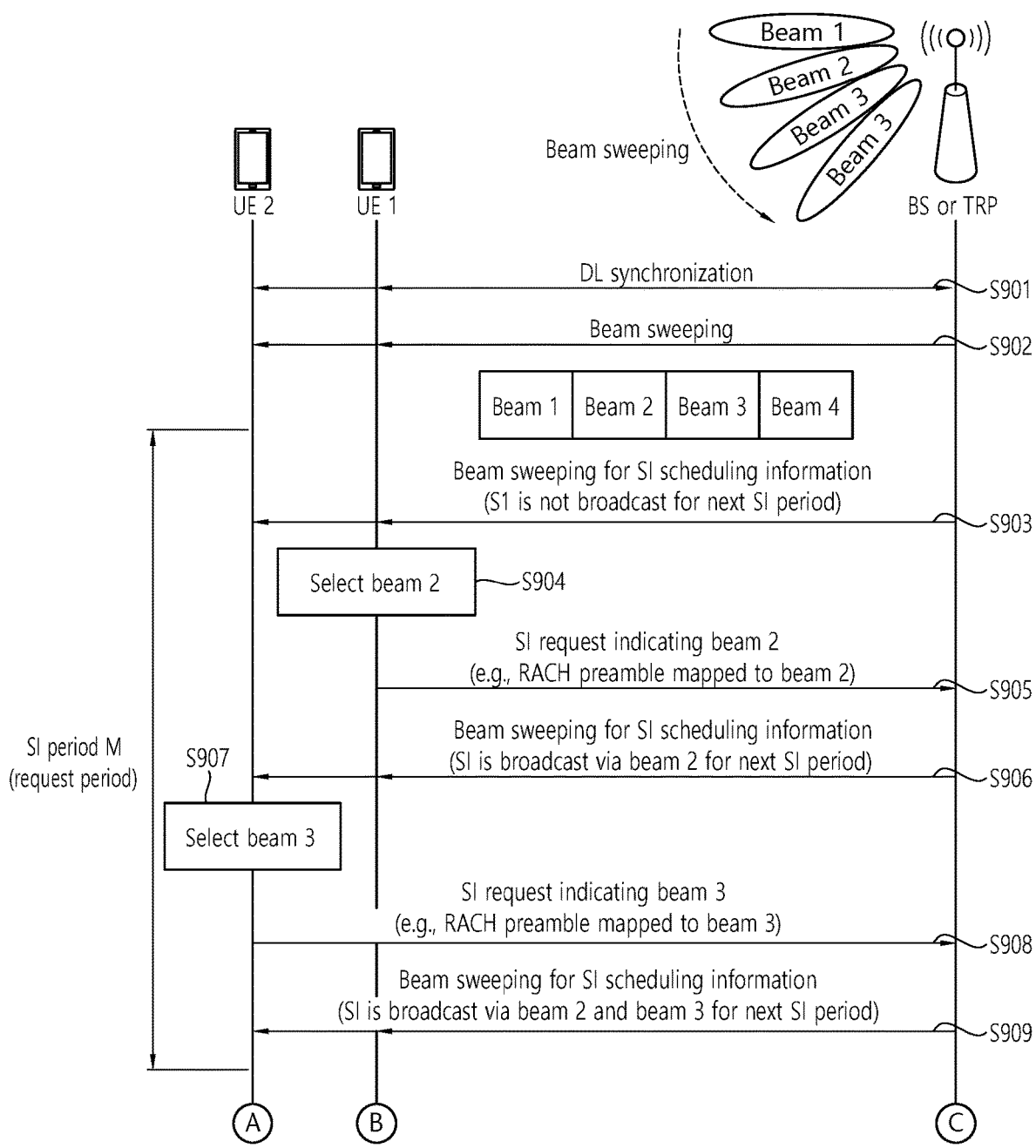
FIG. 9A and FIG. 9B illustrate a procedure in which requested system information is transmitted based on beamforming, according to an embodiment of the present invention.
Figure 9B:
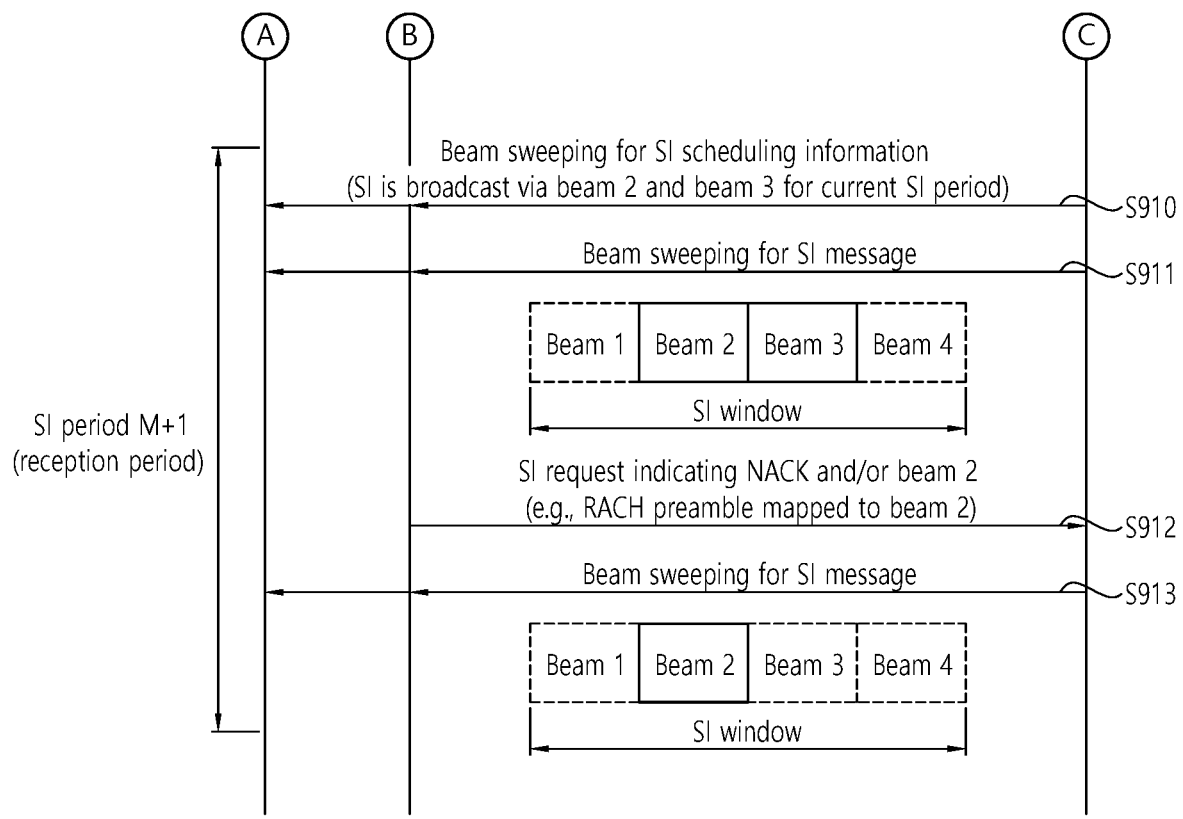

FIG. 9A and FIG. 9B illustrate a procedure in which requested system information is transmitted based on beamforming, according to an embodiment of the present invention.

Referring to FIG. 9A, the base station can perform beam sweeping. In the embodiment of FIG. 9A, it is assumed that the base station sweeps the first to fourth beams, but this only means that the base station can sweep the plurality of beams, but the number of swept beams is not limited by the embodiment of FIG. 9A. The base station may also be referred to as a Transmission Reception Point (TRP). SI period M means a time period during which system information is requested, and SI period M+1 following the SI period M may mean a time period during which the requested system information is received. That is, the SI period M may be a system information request period, and the SI section M+1 may be a system information receiving period. Preferably, SI period M and SI period M+1 may not overlap each other.

In step S901, the UE can perform downlink synchronization with a cell or TRP of the base station.

In step S902, the base station can transmit a plurality of beams in the beam sweep period. The beam sweep period may refer to a period during which the base station sweeps the antenna beam of the base station in whole or in part. Different beams can be transmitted at different time intervals. For example, different beams may be transmitted in different symbols or in different subframes, possibly with a beam reference signal (BRS).

In step S903, the base station can transmit the SI scheduling information. In the present specification, the SI scheduling information may also be referred to as beam information. For example, the SI scheduling information may be transmitted in SI period M via MIB or SIB type 1. It is assumed that the base station has not yet received a system information request from a UE. Accordingly, in step S903, the SI scheduling information transmitted by the base station may indicate that no SI message is scheduled in the SI period M+1. The SI scheduling information may indicate that the system information request can be transmitted.

In step S904, the first UE may select a beam. The first UE can measure the quality of each beam by receiving different beams at different time intervals. The first UE may select a beam that provides the highest measurement quality among all beams. Alternatively, the first UE may select one or more beams whose measured quality is above a threshold. In the embodiment of FIG. 9A, the first UE measures the quality of the first to fourth beams, and assumes that the second beam is selected based on the measured quality.

In step S905, the first UE can know that no SI message is scheduled in the SI period M+1 based on the SI scheduling information received in step S903. Thus, when the first UE desires to acquire the system information, the first UE may transmit a system information request indicating the selected second beam. For example, the base station may allocate a PRACH preamble set for the second beam. The first UE may select a preamble from among the allocated PRACH preamble sets and transmit the selected preamble indicating the second beam. The selected preamble may be a RACH preamble mapped to the second beam.

In step S906, the base station can transmit SI scheduling information. For example, the SI scheduling information may be transmitted in SI interval M via MIB or SIB type 1. The base station has already received the system information request from the first UE in step S905. Accordingly, the SI scheduling information transmitted by the base station in step S906 may indicate that the SI message is to be transmitted through the second beam in the SI interval M+1. The SI scheduling information may indicate that the system information request can be transmitted.

In step S907, the second UE may select a beam. The second UE can measure the quality of each beam by receiving different beams at different time intervals. The second UE may select a beam that provides the highest measurement quality among all beams. Alternatively, the second UE may select one or more beams whose measured quality is above a threshold. In the embodiment of FIG. 9A, the second UE measures the quality of the first to fourth beams and assumes that the third beam is selected based on the measured quality.

In step S908, the second UE can know that the SI message will be transmitted through the second beam only in SI interval M+1 based on the SI scheduling information received in step S906. Thus, when the second UE desires to acquire the system information, the second UE can transmit a system information request indicating the selected third beam. For example, the base station may allocate a PRACH preamble for the third beam. The second UE may select any one of the allocated PRACH preamble sets and transmit the selected preamble indicating the third beam. The selected preamble may be a RACH preamble mapped to the third beam.

In step S909, the base station can transmit the SI scheduling information. For example, the SI scheduling information may be transmitted at SI interval M via MIB or SIB type 1. The base station has already received the system information request from the first UE and the second UE respectively in steps S905 and S908. Therefore, the SI scheduling information transmitted by the base station in step S909 may indicate that the SI message is to be transmitted on the second beam and the third beam in the SI interval M+1. The SI scheduling information may indicate that a system information request can be transmitted.

Referring to FIG. 9B subsequent to FIG. 9A, in step S910, the base station can transmit SI scheduling information. The SI scheduling information may be repeatedly transmitted by the base station. For example, the SI scheduling information may be transmitted in SI interval M+1 via MIB or SIB type 1. The base station has already received the system information request from the first UE and the second UE respectively in steps S905 and S908. Accordingly, the SI scheduling information transmitted by the base station in step S910 may indicate that the SI message is to be transmitted on the second beam and the third beam in the current SI period. The SI scheduling information may indicate that the system information request cannot be transmitted. The reason why the SI scheduling information indicates that the system information request cannot be transmitted is that the current SI period is the SI period M+1 (i.e., the system information receiving period).

In step S911, the base station may transmit the requested system information in the SI period M+1 via the second beam and the third beam. The requested system information may be repeatedly transmitted by the base station.

In step S912, the UE may not be able to successfully receive the requested system information due to some reason. For example, although the first UE has selected the second beam based on the quality of the beam in the SI period M, due to the quality degradation of the second beam in the SI section M+1 where the requested system information is transmitted, the UE may not be able to receive the requested system information through the second beam. If the first UE does not successfully receive the requested system information, the first UE may send a system information request indicating a NACK and/or a second beam for transmission of the requested system information. For example, the base station may assign a PRACH preamble set for the second beam. The first UE may select a preamble from among the allocated PRACH preamble sets and transmit the selected preamble indicating the second beam. The selected preamble may be a RACH preamble mapped to the second beam. Alternatively, the first UE that has not successfully received the requested system information may transmit HARQ NACK on the PUSCH or PUCCH.

In step S913, if the base station receives the NACK and/or system information request in step S912, the base station may repeat the transmission of the requested system information in the SI period M+1 through the second beam and the third beam. Alternatively, the base station may repeat the transmission of the requested system information in the SI period M+1 only through the second beam.

According to an embodiment of the present invention, a base station can efficiently transmit requested system information through beamforming. The base station can transmit the system information requested by the UE through the beam preferred by the UE served by the base station. In addition, the base station may transmit the system information requested by the specific UE and the information about the beam, through which the requested system information is transmitted, to all UEs served by the base station, so that the UE does not transmit unnecessary system information requests to the base station.

Figure 10:
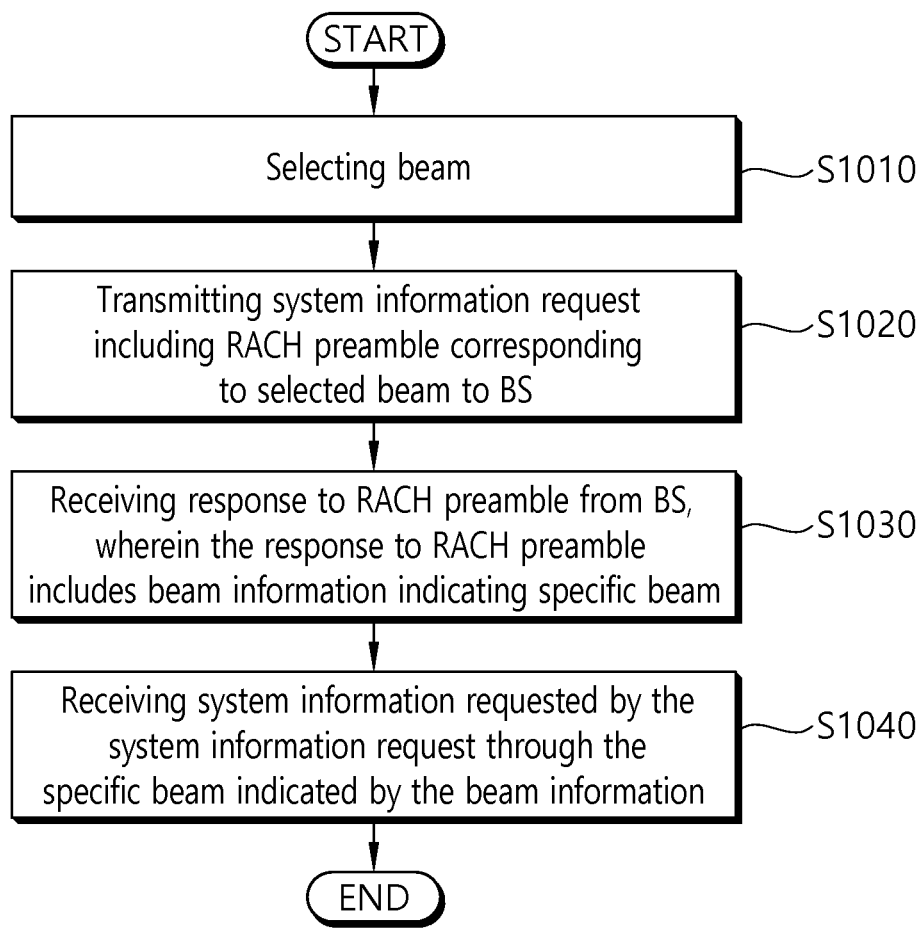
FIG. 10 is a block diagram illustrating a method for receiving, by a user equipment (UE), system information based on beam information, according to an embodiment of the present invention.

FIG. 10 is a block diagram illustrating a method for receiving, by a UE, system information based on beam information, in accordance with an embodiment of the present invention.

Referring to FIG. 10, in step S1010, the UE can select a beam. For selection of the beam, the UE may measure the quality of the plurality of beams transmitted by the base station. The selected beam may be the best measured beam among the plurality of beams transmitted by the base station. Alternatively, the selected beam may be a beam of which the measured quality being above a predefined threshold, among the plurality of beams transmitted by the base station.

In step S1020, the UE may transmit a system information request including a RACH preamble corresponding to the selected beam to the BS.

The system information request may be transmitted in a system information request period. The requested system information may be received in a system information reception period. Preferably, the system information request period and the system information reception period may not overlap with each other.

In step S1030, the UE can receive a response to the RACH preamble from the BS. The response to the RACH preamble may include beam information indicating a specific beam. The beam information may indicate that the system information request can be transmitted in the system information request period. The beam information may indicate that the system information request cannot be transmitted in the system information reception period. The beam information may indicate that the requested system information is to be transmitted in the system information reception period through the specific beam.

The beam information may be received through a master information block (MIB) or a system information block 1 (SIB1).

In step S1040, the UE can receive the system information requested by the system information request through the specific beam indicated by the beam information.

Additionally, if the requested system information is not received, the UE may retransmit the system information request including the RACH preamble corresponding to the selected beam to the base station. The UE may re-receive the system information requested by the system information request through the specific beam indicated by the beam information.

Additionally, if the requested system information is not received, the UE may transmit a negative acknowledgment (NACK) to the base station.

Figure 11:
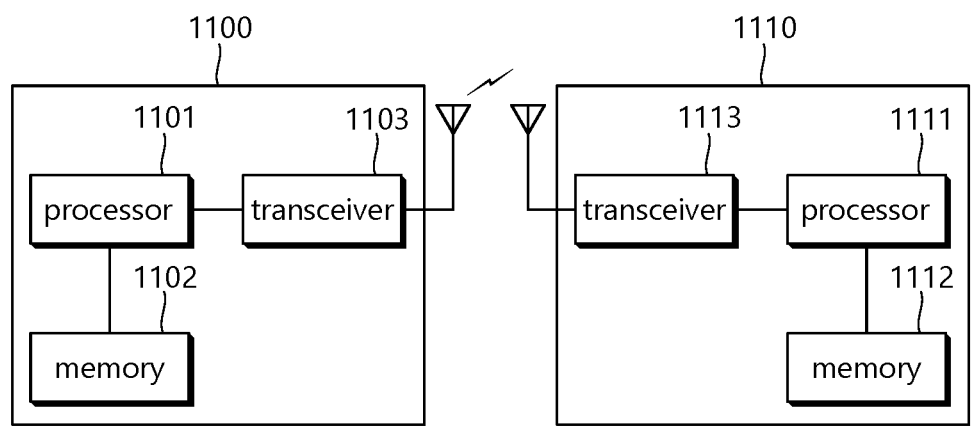
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving, by a wireless device, on-demand system information in a wireless communication system, the method comprising:

receiving, from a base station, a system information block including system information (SI) scheduling information and information related to a system information request period, wherein the system information block is transmitted by the base station based on a plurality of first beams, and wherein the SI scheduling information informs the wireless device whether the on-demand system information is to be broadcasted or not;

based on the on-demand system information not being broadcasted:

measuring quality of the plurality of first beams;

selecting one beam from among a plurality of second beams with quality above a threshold among the plurality of first beams, based on availability of the plurality of second beams with quality above the threshold;

selecting a random access preamble for a system information request corresponding to the selected beam;

transmitting, to the base station in the system information request period, the random access preamble for the system information request corresponding to the selected beam; and receiving a response to the random access preamble from the base station, wherein the response to the random access preamble includes the on-demand system information requested by the wireless device, wherein transmission of the random access preamble for the system information request is allowed in the system information request period.

2. The method of claim 1, wherein the response to the random access preamble is received based on a system information reception period.

3. The method of claim 2, wherein the system information request period and the system information reception period do not overlap.

4. The method of claim 1, wherein the random access preamble is selected from a plurality of random access preambles based on the selected beam.

5. The method of claim 1, wherein the response to the random access preamble is received through the selected beam.

6. A wireless device for receiving on-demand system information in a wireless communication system, the wireless device comprising:

at least one transceiver; at least one processor; and at least one computer memory operably connectable to the at least one processor and storing instructions that, when executed, cause the at least one processor to perform operations comprising:

receiving, from a base station, a system information block including system information (SI) scheduling information and information related to a system information request period, wherein the system information block is transmitted by the base station based on a plurality of first beams, and wherein the SI scheduling information informs the wireless device whether the on-demand system information is to be broadcasted or not, based on the on-demand system information not being broadcasted:
- measuring quality of the plurality of first beams,
- selecting one beam from among a plurality of second beams with quality above a threshold among the plurality of first beams, based on availability of the plurality of second beams with quality above the threshold,
- selecting a random access preamble for a system information request corresponding to the selected beam,
- transmitting, to the base station in the system information request period, the random access preamble for the system information request corresponding to the selected beam, and
- receiving a response to the random access preamble from the base station, wherein the response to the random access preamble includes the on-demand system information requested by the wireless device, wherein transmission of the random access preamble for the system information request is allowed in the system information request period.

7. The wireless device of claim 6, wherein the response to the random access preamble is received based on a system information reception period.

8. The wireless device of claim 7, wherein the system information request period and the system information reception period do not overlap.

9. The wireless device of claim 6, wherein the random access preamble is selected from a plurality of random access preambles based on the selected beam.

10. The wireless device of claim 6, wherein the response to the random access preamble is received through the selected beam.

* * * * *